United States Patent [19]

Hood et al.

[11] Patent Number: 4,463,058
[45] Date of Patent: Jul. 31, 1984

[54] SILICON CARBIDE WHISKER COMPOSITES

[75] Inventors: Paul E. Hood; John O. Pickens, both of Greer, S.C.

[73] Assignee: Atlantic Richfield Company, Los Angeles, Calif.

[21] Appl. No.: 274,256

[22] Filed: Jun. 16, 1981

[51] Int. Cl.$^3$ ............................................. C01B 31/36
[52] U.S. Cl. ...................................... 75/229; 75/950; 423/345; 501/32; 501/88; 524/443; 420/548; 419/17; 419/24; 419/28; 419/30
[58] Field of Search ............... 428/549, 614; 423/345, 423/211, 226, 229; 75/208 R

[56] References Cited

U.S. PATENT DOCUMENTS

| | | | |
|---|---|---|---|
| 3,015,154 | 1/1962 | Evans | 428/577 |
| 3,441,392 | 4/1969 | Divecha et al. | 75/226 |
| 3,645,124 | 2/1972 | Rohrabaugh | 428/577 |
| 3,933,984 | 1/1976 | Kimura et al. | 423/345 |

*Primary Examiner*—Veronica O'Keefe
*Attorney, Agent, or Firm*—James W. McClain; Stanley A. Becker

[57] ABSTRACT

The invention features a method and resultant article of the method, wherein deagglomerated silicon carbide whiskers are uniformly dispersed and/or distributed in a matrix material, generally a metal. The uniform distribution achieved by the invention greatly enhances the mechanical properties of the composite, such as the ultimate strength. The method comprises the deagglomeration of silicon carbide whiskers prior to mixing with matrix materials.

9 Claims, 3 Drawing Figures

SILICON CARBIDE WHISKER COMPOSITES

FIELD OF THE INVENTION

The invention relates to silicon carbide reinforced composite materials, and more particularly to a method, and resultant article of the method, wherein silicon carbide whiskers are uniformly dispersed and/or distributed throughout the matrix of the composite material.

BACKGROUND OF THE INVENTION

For many years, it has been recognized that metals, plastics and other medium and low strength materials could be reinforced with silicon carbide whiskers. These whiskers are small fibers, which are mixed with the powdered metal or plastic to form a composite material.

The silicon carbide whiskers are obtained by well-known processes, such as by reacting coked rice hulls, a throw-away byproduct of rice production, as is taught in U.S. Pat. No. 3,754,076, issued Aug. 21, 1973 to Cutler.

The whiskers being fibers with anisotropic properties, have properties which are used to greatly reinforce and improve the mechanical properties of other materials.

While the advantages of utilizing these whiskers are well-known, it has been very difficult to properly mix these whiskers with other substances due to their initial agglomerated state. The mass of agglomerated whiskers when mixed with other materials will produce a non-homogeneous composite of lower mechanical strength.

In order to achieve the maximum benefits of whisker reinforcement, it is necessary to thoroughly and uniformly disperse and/or distribute the whiskers throughout the matrix material. Such dispersion requires thorough deagglomeration and mixing without substantial damage to the whiskers.

It has been taught in the prior art that mixing whiskers with matrix material and a non-polar solvent containing a polymeric binder can provide a random distribution of whiskers in the matrix. Such a teaching is shown in U.S. Pat. No. 4,259,112, issued Mar. 30, 1981 to Doloruy et al.

While U.S. Pat. No. 4,259,112 asserts being able to achieve a homogeneous composite, this homogeneity is not sufficient to provide a material (for a given whisker content) having the superior mechanical properties of this invention. For example, for a 2024 aluminum composite containing 20 percent by volume SiC whiskers, the above patent lists an ultimate tensile strength of 55.4 kpsi, whereas the inventive composite has an ultimate tensile strength (in a naturally aged temper) of approximately 100 kpsi.

Expressed in another way, since U.S. Pat. No. 4,259,112 does not teach deagglomerating the whisker mass prior to mixing, the product disclosed will be a composite containing agglomerates. These agglomerates seriously detract from the mechanical performance.

It has been discovered by the present inventors that the agglomerated whisker mass can be deagglomerated prior to mixing by treating it with a highly polar solvent and milling the solvated mass into a deagglomerated slurry. Alcohols, water and halogenated hydrocarbons are good polar solvents for this purpose. These directionally charged solvents are believed to work by reason of their ability to neutralize the statically charged whiskers of the agglomerated mass. This neutralization allows the whiskers to separate, i.e. deagglomerate, upon subsequent milling of the slurry.

When a polar solvent slurry of deagglomerated whiskers is then mixed with matrix material, such as powdered aluminum, a highly homogeneous, uniformly dispersed whisker composite is achieved, which is free of agglomerates. The deagglomerated whiskers are easier to mix with matrix materials due to the prior deagglomeration.

While treatment with non-polar solvents may be useful in assisting mixing by way of solvating the whisker mass, it does not provide the higher degree of uniformity and homogeneity achieved with the use of polar solvents and does not eliminate agglomerates. This is so because, prior deagglomeration of the whisker mass is not achieved without charge neutralization and milling.

The above deagglomerating process has produced aluminum composites of very high ultimate strengths. This is the first time to the best of our knowledge and belief, anyone has been able to consistently achieve an aluminum and silicon carbide whisker composite approaching an ultimate strength of 100 kpsi.

BRIEF SUMMARY OF THE INVENTION

The invention pertains to a substantially homogeneous composite material comprising a matrix material and a number of deagglomerated silicon carbide whiskers substantially, uniformly and homogeneously dispersed and distributed throughout said matrix material to provide reinforcement thereto.

For the purpose of definition, the term "whiskers" shall mean fibers or particles or mixtures thereof, which may be uniformly dispersed within a matrix by method or methods herein disclosed or suggested.

The composite material is derived from the process of: (a) forming a deagglomerated slurry of silicon carbide whiskers; (b) mixing said deagglomerated whisker slurry with a powder or slurry of matrix material to form a mixture of substantially, uniformly and homogeneously dispersed whiskers within said matrix material; and (c) obtaining a dry composite mixture.

The dry composite mixture may then be formed into a billet, and the billet may be further extruded, forged, machined, etc. to form a product.

A polar solvent, such as alcohol, water, or a halogenated hydrocarbon, must be used in forming a deagglomerated slurry of the whisker mass, and can also be used to form a slurry of the matrix material in order to facilitate the mixing of the whiskers and the matrix material.

The matrix material may be aluminum, magnesium, titanium, zinc, tin, iron, nickel, mercury, antimony, lead, copper, or alloys thereof, glass, plastic, ceramic, etc.

When a composite is fabricated, silicon carbide whiskers can be added in an approximate range of from 0.001 to 50 percent by volume of the total volume of the composite.

Preferably about 5 to 25 percent by volume of whiskers are added to the matrix.

It is an object of the invention to provide an improved process and article of manufacture comprising a composite of a matrix material having silicon carbide whisker reinforcement therein;

It is another object of this invention to provide a composite of a matrix material having deagglomerated silicon carbide whisker reinforcement therein, which is substantially, uniformly and homogeneously distributed and/or dispersed within the matrix.

These and other objects of the invention will be better understood and will become more apparent with reference to the following detailed description considered in conjunction with the accompanying drawings.

DETAILED DESCRIPTION OF THE INVENTION

Generally speaking, the invention pertains to a process (and resultant article of manufacture) for deagglomerating an agglomerated mass of silicon carbide whiskers prior to mixing the whiskers with a matrix material. Upon mixing, a mixture of the matrix material and the silicon carbide whiskers is formed, which is substantially free of agglomerates. The resulting mixture has whiskers that are substantially, uniformly and homogeneously dispersed and/or distributed within the matrix.

Figure 1:
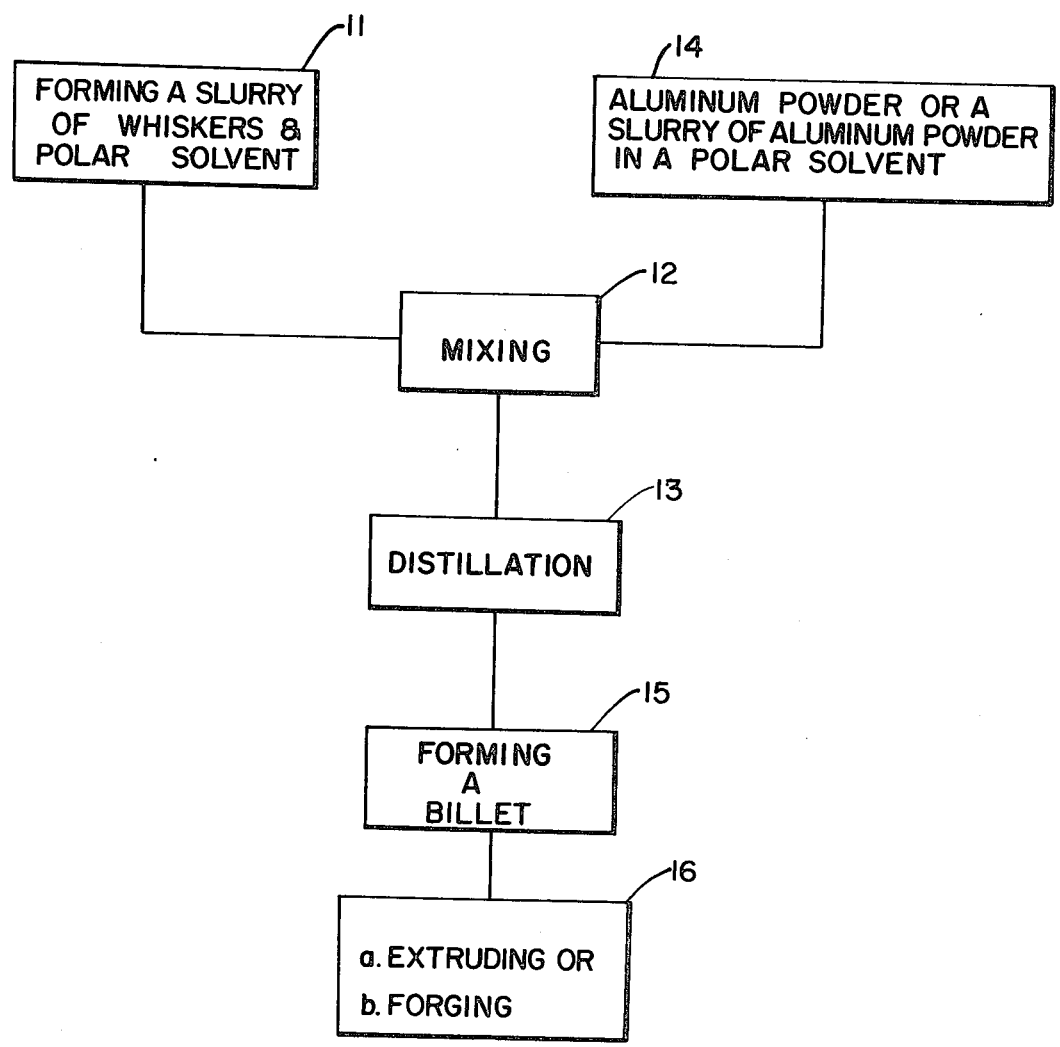
FIG. 1 is a flow diagram of the process of this invention.

Now referring to FIG. 1, a flow diagram of the process of the invention is shown. The silicon carbide whiskers obtained from the converted rice hulls are generally in an agglomerated condition.

A weight of 20 to 200 grams of whiskers is added to a 750 ml volume of n-butanol or other equivalent polar solvent, in accordance with block 11 of the process flow diagram. Any polar solvent which will not react with silicon carbide may be used, such as: halogenated hydrocarbons, e.g. methylene or ethylene chloride; alcohols, e.g. tertiary butanol; and water.

The above mixture is stirred for approximately 30 minutes. The slurry is placed in a ball mill and milled for approximately an hour.

The resulting deagglomerated whisker slurry is then mixed with a matrix material, e.g. about 1,000 to 1,200 grams of aluminum powder according to block 12.

The aluminum powder can be mixed with the whisker slurry as a dry powder, or it may be mixed in the form of a slurry (aluminum powder in n-butanol) similar to the whisker slurry, as shown in block 14. For the purpose of making an aluminum slurry, approximately 500 ml of n-butanol are stirred into the aluminum powder.

The mixing (block 12) of the whiskers and aluminum is accomplished by stirring the mixture for approximately 2 minutes.

The mixture is then distilled or dried of the n-butanol solvent according to block 13, by placing the mixture in a drying oven until substantially all of the solvent (n-butanol) has evaporated.

The dried composite mixture is then formed into billets, according to block 15.

Three, six or twelve inch diameter cylindrical dies are lined and fitted with a carbon plug on the bottom end. The die and die carrier are grounded. The composite mixture is placed in an appropriate sized plastic bag, the bag lowered into the die, and the bag cut to release the powder into the die. The process is repeated until the die contains the correct weight of the composite mixture. Another carbon plug is fitted in the top of the die, and the loaded die placed inside a vacuum chamber of a hot press. The vacuum chamber is sealed, a 1,000 micron vacuum attained, and the chamber bled to atmosphere. Pressing rams are placed atop the carbon plug and aligned. The chamber is re-evacuated to about 200 microns or less as the heating cycle is started. The loaded die undergoes a time-temperature-pressure cycle until a cylindrical billet is compacted. The compacted billet is allowed to cool to room temperature, and is stripped from the die.

The billet of the composite material may contain from 0.001 to 50 pct. by volume silicon carbide whiskers, and more particularly about 5 to 25 pct. SiC by volume of the total.

The billet may then be extruded, forged, machined, etc. according to block 16.

The formed product is then heat treated to obtain the desired properties as is known to those skilled in the art.

Composites of superior mechanical strengths are possible according to the above process. Table 1 illustrates the tensile properties of three aluminum samples. The first sample is for an aluminum alloy and whisker composite made by a method similar to that shown in FIG. 1. A non-polar solvent (heptane) was used in place of n-butanol. The second sample is for an aluminum composite made in accordance with the inventive process depicted in FIG. 1, and the third sample is for unreinforced aluminum.

As can be observed from Table 1, the composite (sample No. 2) fabricated in accordance with the invention has superior mechanical properties, including an ultimate tensile strength of about 90 kpsi.

Figure 2A:
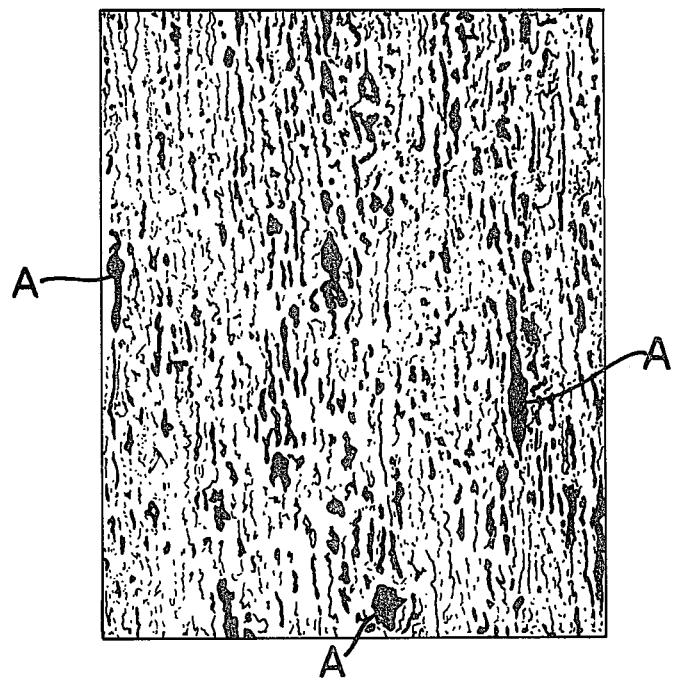
FIG. 2a is an enlarged cross-sectional view of a matrix material mixed with agglomerated silicon carbide whiskers produced with a non-polar (heptane) solvent.
Figure 2B:
FIG. 2b is an enlarged cross-sectional view of a matrix material mixed with deagglomerated silicon carbide whiskers according to the process shown in FIG. 1.

Enlarged cross-section (100×) of samples Nos. 1 and 2 are illustrated in FIGS. 2a and 2b, respectively.

FIG. 2a shows that the use of a non-polar solvent in the mixing process cannot effectively deagglomerate the whisker mass. This is so, because the composite material is filled with silicon carbide agglomerates "A". These agglomerates "A" are responsible for the fact that this sample (No. 1) did not achieve as high a mechanical strength as Sample No. 2, shown in FIG. 2b.

TABLE 1

TENSILE PROPERTIES OF Al AND Al—SiC METAL MATRIX COMPOSITES

| No. | Sample | Dispersion Media | Ultimate Strength (KPSI) | Yield Strength (KPSI) | Modulus of Elasticity (PSI × 10$^6$) | Elongation (Percent) |
|---|---|---|---|---|---|---|
| 1. | 6061-T6 with 20 v/o SiC whiskers | Heptane | 73.6 | 56.3 | 14 | 2.38 |
| 2. | 6061-T6 with 20 v/o | Butanol | 90.6 | 58.7 | 15.2 | 2.6 |

TABLE 1-continued

TENSILE PROPERTIES OF Al AND Al—SiC METAL MATRIX COMPOSITES

| No. | Sample | Dispersion Media | Ultimate Strength (KPSI) | Yield Strength (KPSI) | Modulus of Elasticity (PSI × 10$^6$) | Elongation (Percent) |
|---|---|---|---|---|---|---|
| 3. | SiC whiskers 6061-T6 (IM) (Unreinforced) | — | 45 | 40 | 10 | 12.0 |

As can be observed from the cross-section of Sample No. 2, the composite has a matrix containing a substantially homogeneous and uniform dispersion of deagglomerated silicon carbide whiskers. It is this uniformity and homogeneity which accounts for the superior mechanical properties of Sample No. 2.

Table No. 2 below, illustrates the substantial improvement of the product of this invention compared to that of the prior art U.S. Pat. No. 4,259,112).

TABLE 2

TENSILE PROPERTIES OF Al AND Al—SiC METAL MATRIX COMPOSITES OF 2024 ALLOYS

| No. | Sample | Ultimate Strength (KPSI) | Yield Strength (KPSI) | Modulus of Elasticity (PSI × 10$^6$) | Elongation (Percent) |
|---|---|---|---|---|---|
| 1. | 2024-T4 with 20 v/o SiC Whiskers | 100.4 | 58.6 | 17.8 | 1.92 |
| 2. | 2024-T4 (IM) Unreinforced | 60.0 | 44.0 | 10.8 | 12.0 |
| 3. | 2024 as reported in Pat. No. 4,259,112 | 55.4 | 38.5 | 16.6 | — |

The above teachings are subject to modifications and changes as befits the skilled practitioner of this art. Therefore, the description of the invention is meant to convey an exemplary best mode teaching of the invention.

What is desired to be protected by Letters Patent is presented in the following appended claims:

What is claimed is:

1. A method of preparing a composite material including a reinforced matrix of substantially uniformly distributed deagglomerated silicon carbide whiskers, comprising the steps of:

(a) deagglomerating agglomerated silicon carbide whiskers by mixing with a polar solvent and milling under conditions that result in a mixture substantially free from agglomeration; and (b) mixing the deagglomerated whiskers with a matrix material to form a mixture of substantially uniformly and homogeneously dispersed whiskers within said matrix material.

2. The method of claim 1, further comprising the step of:

(c) forming a billet of said composite material.

3. The method of claim 1, wherein said deagglomerating step (a) further includes the step of:

(c) forming a slurry of silicon carbide whiskers with a polar solvent.

4. The method of claim 2, further comprising the step of:

(d) forging said billet.

5. The method of claim 2, further comprising the step of:

(d) extruding said billet.

6. The method of claim 3, wherein said polar solvent is selected from a group consisting of alcohols, water and halogenated hydrocarbons.

7. The method of claim 1, wherein said matrix material is selected from a group consisting of aluminum, magnesium, titanium, lead, zinc, tin, iron, nickel, copper, antimony, mercury, and alloys thereof.

8. The method of claim 1, wherein said matrix material is selected from a group consisting of glass, ceramic and plastic.

9. A substantially homogeneous composite material comprising an aluminum matrix reinforced by silicon carbide whiskers deagglomerated according to the method of claim 1 which are substantially uniformly and homogeneously dispersed and distributed throughout said aluminum matrix.

* * * * *